May 18, 1965     M. H. WOJCIK     3,184,641
ELECTRICAL CIRCUIT FOR TRANSLATING A MECHANICAL
VARIATION INTO AN ELECTRICAL VARIATION
Filed July 24, 1961     2 Sheets-Sheet 1
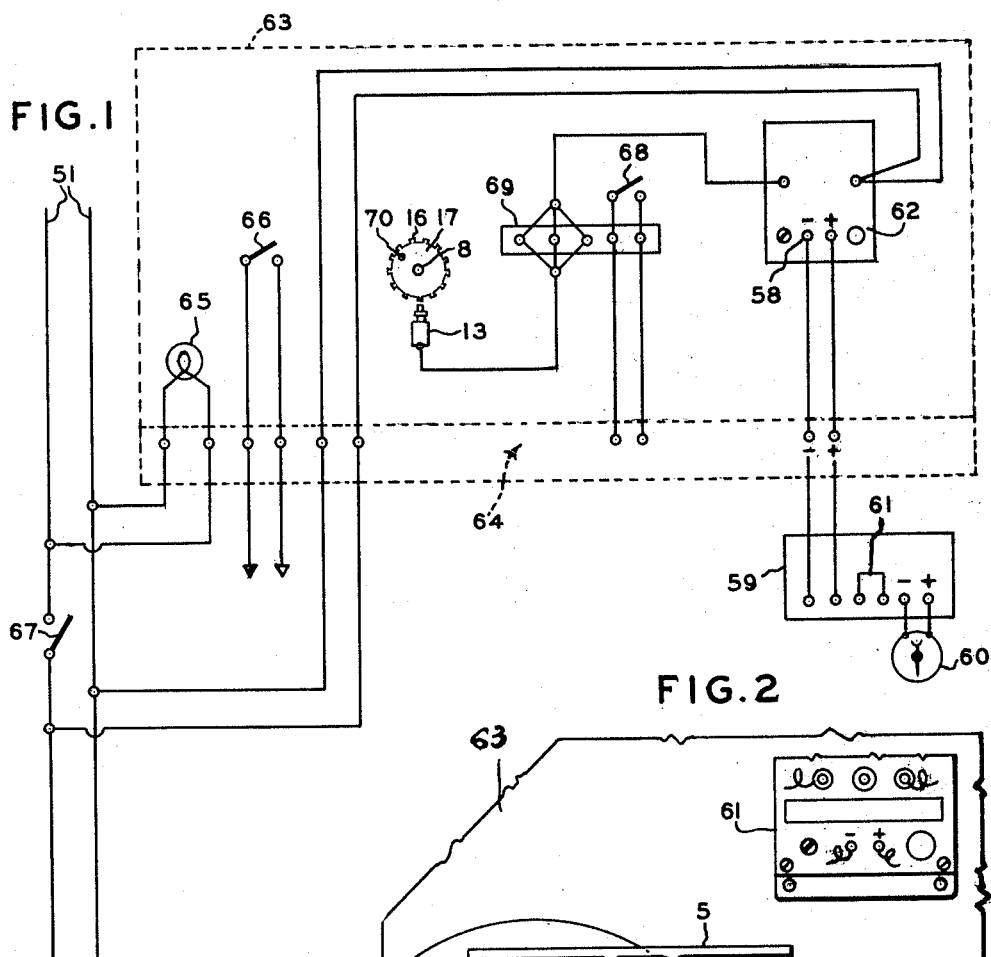
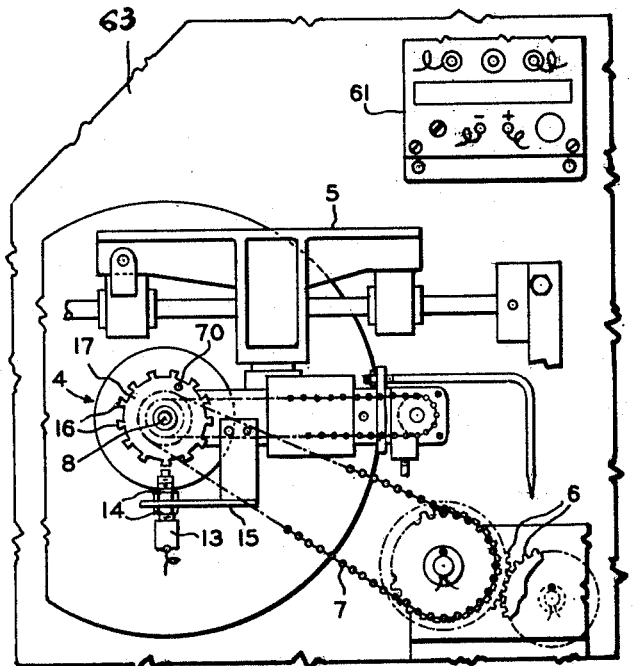
INVENTOR
M.H. WOJCIK
BY John A. Seifert
ATTORNEY May 18, 1965
M. H. WOJCIK
3,184,641
ELECTRICAL CIRCUIT FOR TRANSLATING A MECHANICAL
VARIATION INTO AN ELECTRICAL VARIATION
Filed July 24, 1961
2 Sheets-Sheet 2

INVENTOR
M.H.WOJCIK
BY John A. Seifert
ATTORNEY 3,184,641
ELECTRICAL CIRCUIT FOR TRANSLATING A MECHANICAL VARIATION INTO AN ELECTRICAL VARIATION
Matthew H. Wojcik, Garfield, N.J., assignor to Merrick Scale Mfg. Company, Passaic, N.J., a corporation of New Jersey
Filed July 24, 1961, Ser. No. 126,056
9 Claims. (Cl. 317—5)

This invention relates to an electrical circuit for translating a mechanical variation into an electrical variation operating indicating means to indicate the mechanical variation.

This invention is shown in association with means of weighing mechanism for integrating the product of two variables, such as a load on a traveling conveyor, for the purpose of illustration and said invention is not limited to integrating means but is also applicable to any rotating mechanism requiring no frictional coupling and having a revolution of 0 to 300 per minute.

It is an object of the invention to provide means to indicate the revolution of a rotating member which does not require a mechanical or magnetic interaction and thereby eliminating frictional error.

It is another object of the invention to utilize the advantage of the inherent long-live characteristics of transistors in the electrical circuit to provide reliable indications not affected by vibrations.

It is another object of the invention to provide in the electrical circuit a regenerative feed-back to sustain the oscillations of an oscillator circuit and a degenerative feed-back to regulate the sensitivity of said oscillator circuit.

It is a further object of the invention to provide an oscillator output after demodulation consisting of constant-amplitude square waves regardless of line voltage and temperature variations.

Other objects and advantages of the invention will be set forth in the detailed description of the invention.

In the drawings accompanying and forming a part of this application:

FIGURE 1 is schematic view of the invention;

FIGURE 2 is a partial view of an integrator showing the structural relationship between a pulser wheel and a coil forming part of the electrical circuit.

Figure 3:
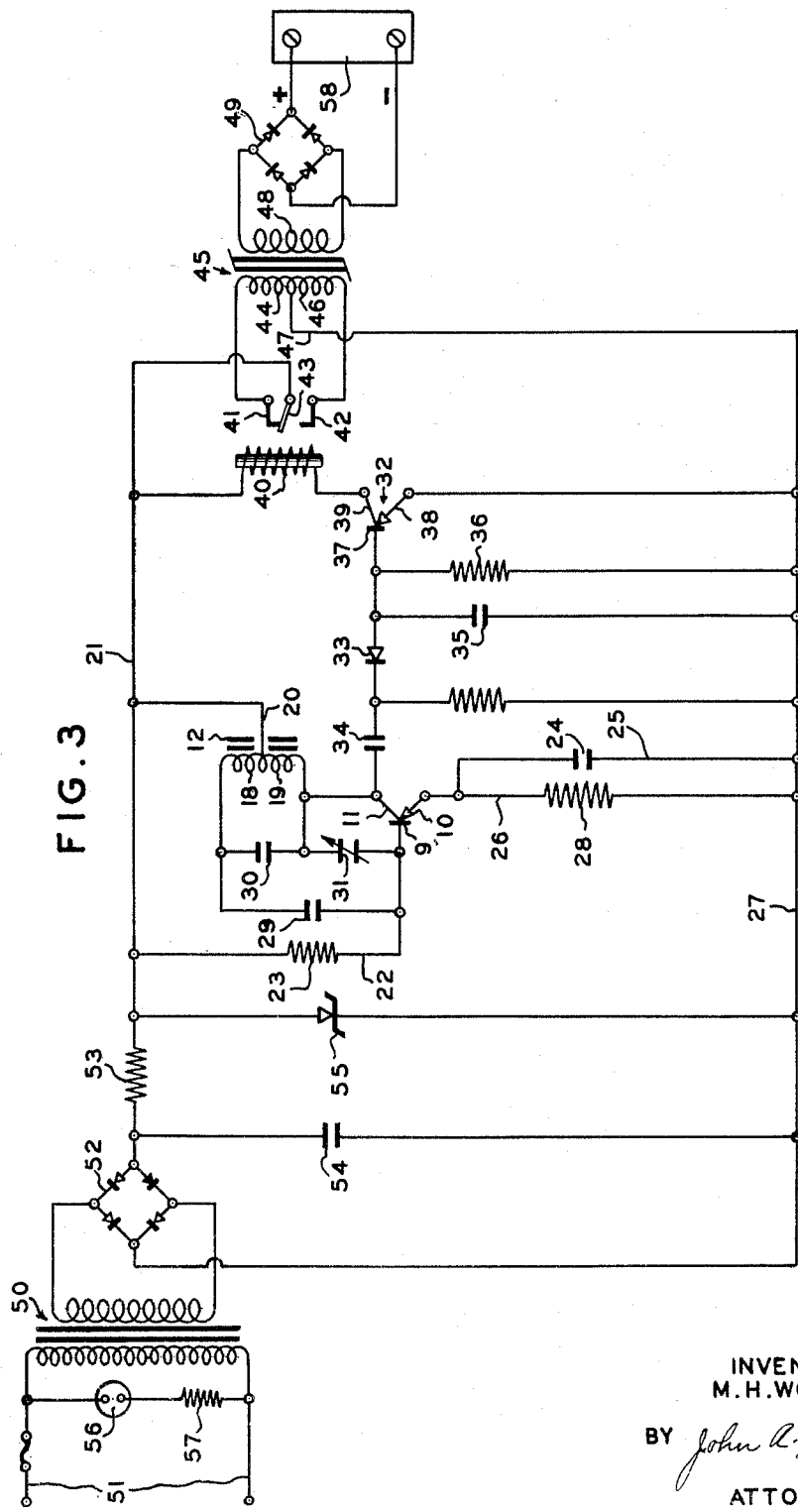
FIGURE 3 is a schematic view of the electrical circuit.

In the present illustration of the invention, there is shown an integrator, as generally indiciated at 4 in FIGURE 2, for integrating the product of a load on a traveling conveyor, not shown. The load on the conveyor is imparted to the integrator 4 by a tiltable and slidable carriage 5 and the rate of travel of the conveyor is transmitted to the integrator 4 by gearing 6 and a sprocket chain 7. The integrator 4 is provided with an output shaft 8.

The object of the invention is to translate the revolutions of the integrator shaft 8 into electrical impulses and to transfer said electrical impulses to means to indicate the load on the conveyor in a predetermined period of time. This is accomplished by an electrical circuit shown in FIGURE 3 and comprising a series-fed Hartley oscillator in the form of a transistor having a base electrode 9, an emitter electrode 10 and a collector electrode 11. The transistor 9, 10, 11 generates sinusoidal waves which are interrupted by the rotation of the integrator output shaft 8 through a transformer 12 mounted in a casing 13 adjustably supported by nuts 14 on a bracket 15, as shown in FIGURE 2. The transformer constitutes a pick-up coil which is spaced from the path of travel of the extremities of a plurality of teeth or projections 16 of conductive material equidistantly spaced on the periphery of a wheel 17 secured to the integrator output shaft 8, as shown in FIGURES 1 and 2. When a tooth 16 approaches the pick-up coil 12, the "Q" of said pick-up coil is lowered and the circut of the oscillator 9, 10, 11 is blocked abruptly with the result that said oscillator ceases to oscillate and the oscillation is restored when said tooth 16 moves away from the pick-up coil 12.

The pick-up coil or transformer 12 is provided with windings 18 and 19 having a common tap 20 electrically connected to a power lead 21. The transistor base electrode 9 is also electrically connected by a conductor 22 to said power lead 21 with a resistor 23 interposed in said conductor 22 to provide the necessary bias for the circuit of the transistor base and emitter electrodes. Regenerative feed-back is obtained from the induced voltage in the transformer. Bias for the transistor collector electrode is obtained through the pick-up winding 19. A capacitor 24 is interposed in a conductor 25 electrically connected to a conductor 26 and to a return power line 27, so that the capacitor 24 provides an A.C. by pass or shunt around a resistor 28 interposed in the conductor 26 which is connected to the return power line 27 and to the transistor emitter electrode 10. A regenerative feedback is obtained from the induced voltage in the pick-up winding 18 coupled through a capacitor 29 electrically connected to the terminal of said winding 18 and to transistor base electrode 9. The frequency determining network consists of a series combination of transformer 12 and windings 18 and 19 in parallel with a capacitor 30 electrically connected to the terminals of the windings 18 and 19. Since the capacitor 30 and the transformer 12 are not variable, the circuit frequency is fixed to approximately 400 kilocycles. The inductance of the transformer 12 functions as an auto-transformer to provide the regenerative feed-back signal. Degenerative feed-back is also introduced into the circuit as an oscillator sensitivity adjustment for increment changes in the circuit of the transformer 12 and the windings 18 and 19. Said degenerative feed-back is obtained from the transistor collector electrode 11 and is coupled through a variable capacitor 31 to the transistor base electrode 9. The introduction of the degenerative feed-back through the variable capacitor 31 also provides frequency and amplitude stability. The amount of degenerative feed-back is a variable quantity and is adjusted by the variable capacitor 31. The variable quantity is determined primarily by the sensitivity requirements of the transformer 12 and the windings 18 and 19. An increase in the capacitance of the variable capacitor 31 increases the degenerative feed-back voltage, thereby reducing the gain of a D.C. amplifier 32 and effectively increasing the sensitivity of the electrical circuit to minute particles of ferrous materials.

The output of transistor 9, 10, 11 is coupled to the input of a diode detector 33 through a capacitor 34. The detector circuit rectifies and filters the frequency variation of the signal of the transistor 9, 10, 11. The output of the detector 33 is a negative voltage during the period when sustained oscillations of the transistor 9, 10, 11 exist. The output of the detector 33 is provided with a capacitor 35 operating as a filter and a resistor 36 acting as the load. The diode detector 33 conducts one-half of a cycle and therefore the current flows through the resistor 36. When the detector 33 conducts, the capacitor 35 charges to the voltage drop across the resistor 36 and the capacitor 35 discharges through the resistor 36 when the detector 33 is not conducting. The time constant of the resistor 36 and of the capacitor 35 prevents the capacitor 35 from discharging completely before the alternation of the signal from the transistor 9, 10, 11. The charging and discharging of the capacitor 35 filters the output voltage of the transistor 9, 10, 11 which is essentially increasing and decreasing in magnitude. The amplitude changes of the signal of the transistor 9, 10, 11 produce pulsating voltage changes in the output of the detector 33. This output voltage is essentially a series of negative square waves, and therefore the detector 33 and the filter or capacitor 35 yield an accurate reproduction of the pulser wheel 17.

The output of the detector 33 impels the D.C. amplifier 32 comprising a transistor including a base electrode 37, an emitter electrode 38 and a collector electrode 39. Said amplifier 32 actuates a sensitive relay comprising a solenoid 40 electrically connected to the transistor collector electrode 39 and to the power lead 21, a pair of contacts 41 and 42, and an armature 43 engaging the contact 41 when the solenoid 40 is de-energized, as shown in FIGURE 3. The amplifier 32 is connected in a ground-emitter configuration. The current of the transistor collector electrode 39 is near zero in the absence of an input signal to the transistor base electrode 37. When the transistor base electrode 37 is impelled with a negative pulse, the current of the transistor collector electrode 39 increases and energizes the solenoid 40 which will move the armature 43 from the contact 41 to the contact 42 thereby closing a low D.C. circuit. The duration of the pulses is controlled by the spacing of the teeth 16 and the speed of rotation of the wheel 17 and this in turn establishes the dwell time of the relay contacts 41 and 42 and the armature 43. During the space between the pulses, the transistor 9, 10, 11 is generating a signal and a negative voltage is applied to the transistor base electrode 37 which closes solenoid 40 and moves the armature 43 from the contact 41 to the contact 42. When a tooth 16 is in proximity with the pick-up transformer 12, no oscillation exists in the transistor 9, 10, 11 and no signal is rectified and in turn no base current flows through the transistor 37, 38, 39 releasing the armature 43 from the contact 42 to the contact 41.

When the armature 43 is engaged with the contact 41, a direct current flows through one-half 44 of a primary winding of a saturable transformer 45. When the armature 43 is engaged with the contact 42, the current will flow through the other half 46 of the primary winding of the transformer 45. The windings 44 and 46 are separated by a tap 47 connected to the return power line 27. Therefore as the armature 43 is moved from the contact 41 to the contact 42 at regular intervals, a series of alternating voltage pulses are built up across a secondary winding 48 of the transformer 45. The saturable transformer 45 is a frequency sensitive device. When the output of the transformer 45 is rectified, it will deliver a D.C. output voltage proportional to the input frequency.

The action of the saturable transformer 45 is as follows: During the period when the relay armature 43 is engaged with the relay contact 41, the input current through the saturable transformer winding 44 will saturate the core of the transformer 45 to its maximum flux condition in one polarity. When the armature 43 is moved to the contact 42, a current will flow in the opposite direction and through the transformer primary winding 46 and move the core of the transformer 45 to its maximum flux condition in the opposite polarity.

The inductance of the transformer primary 44, 46 is very high, but after the transformer saturates, the inductance drops to nearly equal the air core inductance of the transformer 45. Prior to saturation, the action of the transformer 45 is similar to that of a non-saturating transformer, that is, the wave-shape of the pulse supported at the secondary winding 48 resembles the driving or impelling voltage. Before the transformer 45 saturates on each input half cycle, a pulse of constant volt-second area is supported in the secondary winding 48 of the transformer 45. Once the core of the transformer 45 saturates, a voltage is no longer supported until the core of the transformer 45 is reset by a voltage of the opposite polarity. The volt-second area of the supported pulse is fixed and one pulse of said fixed area is supported for each contact of the relay 41, 42, 43. As the frequency of the movement of the armature 43 is increased, the number of fixed-area pulses developed per unit of time increases proportionally and these pulses are alternately positive and negative. The pulses of the transformer 45 are rectified by a full-wave bridge rectifier 49 so that two pulses per cycle are produced. The average D.C. value of these pulses is proportional to the repetition rate of movement of the armature 43. With an additional set of contacts 41 and 42 and armature 43, the electrical circuit, shown in FIGURE 3, is capable of being used for both rate and digital measurements, or in local rate measurement, or utilize a carrier system for remote measurement.

Since a constant supply voltage is a prime requirement for stability, a voltage regulated power supply is provided in the circuit shown in FIGURE 3. It is a full wave D.C. supply comprising a power transformer 50 having the primary winding connected to a 115 volt main power line 51 and the secondary winding connected to opposite corners of a diamond bridge rectifier 52 having the other opposite corners connected to the power lead 21 and the return power line 27. In the power lead 21, there is interposed a ballast resistor 53. A filter capacitor 54 is connected to the power lead 21 between the bridge rectifier 52 and the ballast resistor 53 and to the return power line 27. A Zener diode 55 is connected to the power lead 21 between the ballast resistor 53 and the connection between the power lead and the resistor 23 and to the return power line 27. The regulated D.C. output of the transformer 50 is used as a bias source for the transistors 9, 10, 11 and 37, 38, 39 and as an interrupted D.C. current source through relay solenoid 40, relay contacts 41, 42 and relay armature 43 to provide the desired alternating current at the primary windings 44, 46 of the saturable transformer 45. Voltage regulation is required due to circuit variables and any variation in the primary windings of the transformer 50 voltage level due to fluctuations of the power supply line is smoothed out in such a way that the load circuit assures a steady applied voltage. The load voltage also remains constant with normal variations in the circuit load. A lamp 56 serving as a pilot is connected in series with a current limiting resistor 57 across the main power line 51.

The D.C. pulses obtained from the output of the bridge rectifier 49 are transmitted through terminals 58 to a filtering circuit contained in a box 59, as shown in FIGURE 1. The filtering circuit produces an average D.C. value which is directly proportional to the pulses produced by the pulser wheel 17. The circuit in the box 59 is designed so that a full scale input signal will yield a desired output voltage or current to an indicator, recorder or controller 60. The filter requirement is that the signal level at the output side of the box 59 shall equal to that required by the instruments which are to be actuated. A very large value of L.C. time constant is used for linearity and damping. This essentially constant charging current results in a linear output voltage or current to the instrument or instruments. Since the response of the circuit is linear, an indicating meter with a linear scale may be used, and only one frequency point need be calibrated in the initial adjustment of the circuit shown in FIGURE 3. Under these conditions the indicator or recorder yields an accurate reproduction which is linearly proportional to the measured variable. A jumper 61 is interposed in the filtering circuit to increase a lag for indicating and recording purposes. The jumper is not used when the signals are used for control applications and faster response or less lag is required.

The circuit shown in FIGURE 3, with the exception of the pick-up transformer 12, 18, 19 which is housed in the casing 13, is housed in a casing 62 as shown in FIGURES 1 and 2.

In FIGURE 1, the broken lines 63 indicate a cabinet in which the integrator 4 and the casing 62 are housed. A terminal panel 64 is mounted in the cabinet 63. An incandescent lamp 65 is mounted in the cabinet 63 and directly connected in the main power line 51 to continuously absorb moisture in the cabinet 63 and illuminate the cabinet for observing the working conditions of the elements in said cabinet. Switch 66 is adapted to be actuated to circuit closing position by an overload movement of a scale beam, not shown, which is mounted in the cabinet, and said switch 66 is electrically connected to a suitable alarm device, not shown, to indicate that the conveyor is overloaded. Switch 67 is in the main power line 51 exteriorly of the cabinet 63 to manually disconnect and connect the circuit contained in the casing 62. A microswitch 68 is mounted on a terminal block 69 within the cabinet 63 and actuated by a pin or pins 70 projecting from the face of the wheel 17. The microswitch 68 is electrically connected to an electromagnetic counter, not shown, to indicate tons per hour carried by the conveyor.

Having thus described my invention, I claim:

1. An electrical circuit for translating a mechanical variation of conductive material traveling in a fixed path into an electrical variation, including an oscillator electrically connected to both sides of a source of electricity and including a coil in proximity to the path of travel of the mechanical variation and said oscillator generating sinusoidal waves interrupted by the travel of the conductive material of the mechanical variation in proximity to the coil, a diode detector electrically connected in circuit with said oscillator to rectify and filter the frequency variation of the waves generated by the oscillator, an amplifier electrically connected in circuit with said diode detector, a sensitive relay electrically connected in circuit with the amplifier and energized and de-energized by said amplifier depending upon the degree of proximity between the conductive material of the mechanical variation and the coil, a saturable transformer electrically connected in circuit with said sensitive relay to produce a current flow in one direction when the relay is energized and a current flow in the opposite direction when the relay is de-energized, and a rectifier electrically connected to said transformer and constituting the output of the electrical circuit.

2. An electrical circuit as claimed in claim 1, wherein the coil comprises a winding providing a bias for the oscillator and a winding providing a feed-back for the oscillator.

3. An electrical circuit as claimed in claim 1, wherein the oscillator comprises a transistor including a base electrode electrically connected to said source of electricity and to the coil, an emitter electrode electrically connected to the source of electricity, and a collector electrode electrically connected to the coil and to the diode detector.

4. An electrical circuit as claimed in claim 1, wherein the oscillator comprises a transistor including a base electrode electrically connected to said source of electricity and to the coil, an emitter electrode electrically connected to the source of electricity and a collector electrode electrically connected to the coil and to the diode detector, and a variable capacitor interposed in the electrical connection between the coil and the transistor base electrode to provide degenerative feed-back from the transistor collector electrode to the transistor base electrode for increasing the sensitivity of the coil to the conductive material of the mechanical variation.

5. An electrical circuit as claimed in claim 1, wherein the oscillator comprises a transistor including a base electrode electrically connected to said source of electricity and to the coil, an emitter electrode electrically connected to the source of electricity and a collector electrode electrically connected to the coil and to the diode detector, and a resistor interposed in the electrical connection between the source of electricity and the transistor base electrode to provide a bias for the transistor base-emitter circuit.

6. An electrical circuit as claimed in claim 1, wherein the oscillator comprises a transistor including a base electrode electrically connected to said source of electricity and to the coil, an emitter electrode electrically connected to the source of electricity and a collector electrode electrically connected to the coil and to the diode detector, and a capacitor interposed in the electrical connection between the transistor collector electrode and the diode detector.

7. An electrical circuit as claimed in claim 1, wherein the oscillator comprises a transistor including a base electrode electrically connected to said source of electricity and to the coil, an emitter electrode electrically connected to the source of electricity and a collector electrode electrically connected to the coil and to the diode detector, a resistor interposed in the electrical connection between the transistor emitter electrode and the source of electricity, and a capacitor providing an A.C. by-pass around said resistor.

8. An electrical circuit as claimed in claim 1, wherein the sensitive relay comprises a solenoid electrically connected to the amplifier, a pair of contacts electrically connected to the saturable transformer and an armature actuated by the solenoid to close either contact and produce a flow of current in opposite directions in the saturable transformer.

9. An electrical circuit as claimed in claim 1, wherein the saturable transformer comprises a primary winding electrically connected to the sensitive relay and having a tap in an intermediate portion thereof electrically connected to the amplifier, and a secondary winding electrically connected in circuit with the rectifier.

References Cited by the Examiner

UNITED STATES PATENTS

| 1,663,890 | 3/28 | Stoller | 317—5 X |
| 2,703,862 | 3/55 | Gordon | 317—5 |
| 2,731,591 | 1/56 | Kiltie | 321—2 |
| 2,746,683 | 5/56 | McLaren | 324—70 |
| 2,806,181 | 9/57 | Rockafellow | 317—146 |
| 2,941,120 | 6/60 | Harman et al. | 317—5 |
| 2,985,848 | 5/61 | Raffaelli | 317—146 |
| 3,034,022 | 5/62 | Worland | 317—146 |
| 3,042,839 | 7/62 | Hermes | 317—146 |

OTHER REFERENCES

Handbook of Semiconductor Electronics, Hunter, October 1956, pages 14–3 to 14–5 and 14–13 to 14–18.

SAMUEL BERNSTEIN, *Primary Examiner.*